United States Patent [19]

Grigsby, Jr. et al.

[11] Patent Number: 5,700,846

[45] Date of Patent: Dec. 23, 1997

[54] POLYUREA FOAM MADE FROM A PARTIALLY AMINATED POLYETHER POLYAMINE

[75] Inventors: Robert Allison Grigsby, Jr.; Robert LeRoy Zimmerman, both of Austin, Tex.

[73] Assignee: Huntsman Petrochemical Corporation, Austin, Tex.

[21] Appl. No.: 516,690

[22] Filed: Aug. 18, 1995

Related U.S. Application Data

[63] Continuation of Ser. No. 259,832, Jun. 15, 1994, abandoned.

[51] Int. Cl.$^6$ ....................................................... C08G 8/02
[52] U.S. Cl. ........................... 521/128; 521/159; 521/163; 521/174; 528/48; 528/52; 528/59; 528/60; 528/65; 528/76
[58] Field of Search ................................ 521/128, 159, 521/163, 174; 528/48, 52, 59, 60, 65, 76

[56] References Cited

U.S. PATENT DOCUMENTS

| | | | |
|---|---|---|---|
| 3,838,076 | 9/1974 | Moss et al. | 260/2.5 |
| 4,297,444 | 10/1981 | Dominguez et al. | 521/160 |
| 4,530,941 | 7/1985 | Turner et al. | 521/176 |
| 4,845,133 | 7/1989 | Priester et al. | 521/167 |
| 4,904,705 | 2/1990 | Gerkin et al. | 521/163 |
| 4,980,388 | 12/1990 | Herrington et al. | 521/130 |
| 5,081,162 | 1/1992 | Farkas et al. | 521/133 |
| 5,106,884 | 4/1992 | Turner et al. | 521/123 |
| 5,153,232 | 10/1992 | Primeaux | 521/110 |
| 5,155,142 | 10/1992 | Lidy | 521/157 |
| 5,157,059 | 10/1992 | Bauer | 521/163 |
| 5,189,073 | 2/1993 | Humbert et al. | 521/110 |

OTHER PUBLICATIONS

Priester, Jr., Peffley, R.D., Turner, R.B., and R. M. Herrington, "High Resiliency Polyurea Foam–An Improved Flexible Foam Matrix," *32nd Annual Polyurethane Technical/Marketing Conference*, Oct. 1–4, 1989, pp. 21–28.

*Primary Examiner*—James J. Seidleck
*Assistant Examiner*—Dvc Truong
*Attorney, Agent, or Firm*—Russell R. Stolle; Ron D. Brown

[57] ABSTRACT

A process, and the product produced thereby, for preparing a polyurea foam which comprises reacting an aliphatic polyamine having an average functionality from about 2 to about 6 wherein about 55 to about 95 percent of the functional groups are primary amine functional groups and about 5 to about 40 percent of the functional groups are primary or secondary hydroxyl groups with a polyisocyanate in the presence of a blowing agent that comprises water. The use of polyether polyamines having primary hydroxyl groups improves the cross-linking characteristics of the polyurea foam.

20 Claims, No Drawings

POLYUREA FOAM MADE FROM A PARTIALLY AMINATED POLYETHER POLYAMINE

This application is a continuation of application Ser. No. 08/259,832, filed Jun. 15, 1994, now abandoned.

FIELD OF THE INVENTION

This invention relates to polyurea foams, and more specifically, it concerns compositions and processes useful in preparing polyurea foams made from partially aminated polyether polyamines.

BACKGROUND OF THE INVENTION

Flexible polyurea foams are used in a wide variety of applications, particularly as cushioning such as in automobile seats, headrests, dashboards and the like, in furniture, bedding, carpet padding, packaging, toys and the like. The ability to control load bearing properties of such foams is important because each application presents its own requirements of support and/or perceived softness.

Foam-forming formulations are carefully chosen to produce predetermined load bearing properties. Load bearing is, for instance, generally increased by adding fillers, using copolymer polyols, using chain extenders, increasing crosslinking, increasing density or increasing the isocyanate index. These methods of increasing load bearing strength, however, often increase the cost of a foam by requiring use of additional materials. Physical properties or handling properties are also often affected. For instance, viscosity of a foam-forming formulation may often be increased by addition of fillers, copolymer polyols and the like.

As used throughout this specification, the term "polyurea" is meant to embody the polycondensation product obtained from reaction of a compound containing a polyfunctional isocyanate group with a compound containing active hydrogen functional groups in the form of amine groups. It will be appreciated that the compound containing the active hydrogen functional groups can also contain other functional groups. For example, the active hydrogen functional groups may include hydroxyl groups that will react with the isocyanate groups to form urethane linkages. Thus, the term "polyurea" is reserved for those polymers formed with compounds containing at least about 50 percent of active hydrogen functional groups in the form of amine groups.

In the polyurea art, the industrial exploitation of partially or fully aminated polyether polyols has been limited because such compounds react so quickly with isocyanate that it has not possible to produce a foamed product before reaction is complete.

Preparation of polyurea has been described in several prior publications. U.S. Pat. No. 3,838,676 describes polyurea foam prepared with a polyoxyalkylene resin in which 15 to 55 percent of the terminal hydroxyl groups be replaced with an amine. Similarly, U.S. Pat. No. 4,980,388 discloses a polyurea foam produced with an active hydrogen component on which 5 to 60 percent of the active hydrogen groups are primary or secondary amines.

U.S. Pat. No. 5,153,232 discloses a rigid polyurea foam prepared from polyether resins having greater than 50 percent of their active hydrogens in the form of amine hydrogens. However, this patent teaches away from the use of primary hydroxyl groups.

U.S. Pat. Nos. 5,157,059 and 5,189,073 disclose polyurea foams prepared with polyetheramines that are free of hydroxyl groups.

U.S. Pat. No. 5,081,162 discloses a polyurea foam formed from an aminated polyether having at least 50 percent of its active hydrogens in form of amine hydrogen. However, this patent teaches away from polyether polyamines having primary hydroxyl groups. Moreover, this patent requires the use of a permanent gas or the blowing agent to absorb excess heat generation U.S. Pat. No. 5,106,884 discloses in one embodiment a polyurea foam prepared with an active hydrogen compound of which 5 to 60 percent are primary aliphatic amine groups. However, this patent teaches that an amount of alkali metal halide salt is to be added to the reaction mixture.

SUMMARY OF THE INVENTION

The present invention relates to a process for preparing a polyurea foam which comprises reacting an aliphatic polyether polyamine having an average functionality from about 2 to about 6 wherein about 55 to about 95 percent of the functional groups are primary amine functional groups and about 5 to about 40 percent of the functional groups are primary or secondary hydroxyl groups with an isocyanate in the presence of a blowing agent that comprises water. In particular, polyether polyamines having most of its hydroxyl groups as primary functional groups are particularly useful in practicing the present invention because the primary hydroxyl groups improve the cross-linking characteristics of the polyurea foam. Of course, the isocyanate includes quasiprepolymers of polyisocyanates formed with polyols, polyamines, and mixtures thereof, and other additives known in the art can be used in the present invention.

In another embodiment, the present invention includes the polyurea foam produced by the process described herein. The polyurea foam is produced by a process which comprises reacting an aliphatic polyether polyamine having an average functionality from about 2 to about 6 wherein about 55 to about 95 percent of the functional groups are primary amine functional groups and about 5 to about 40 percent of the functional groups are primary or secondary hydroxyl groups with an isocyanate in the presence of a blowing agent that comprises water. In particular, polyether polyamines having most of its hydroxyl groups as primary functional groups are particularly useful in practicing the present invention because the primary hydroxyl groups improve the cross-linking characteristics of the polyurea foam. Of course, the isocyanate includes quasiprepolymers of polyisocyanates formed with polyols, polyamines, and mixtures thereof, and other additives known in the art can be used in the present invention.

DETAILED DESCRIPTION OF THE INVENTION

This invention involves flexible polyurea foam derived from a polyisocyanate component and an active hydrogen component wherein the active hydrogen component has a relatively high equivalent weight and an average of about 1.5 to about 6 active hydrogen-containing groups per molecule, of which active hydrogen-containing groups, at least about 55 percent are amine groups. The relatively high equivalent weight compounds having such amine groups are referred to herein as "polyamines." The polyamines are preferably polyethers having terminal amine and hydroxyl groups. The equivalent weight of the polyamine depends somewhat on the particular type of foam being prepared, but is advantageously from about 400 to about 5000 and, preferably, from about 500 to about 2500, wherein the equivalent weight is the molecular weight divided by the number of hydroxy and amine groups, whether the amine groups are primary or secondary. Thus, the preferred polyether polyamine useful in the present invention has the following formula:

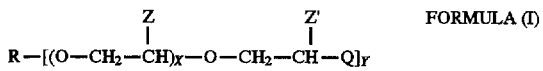  FORMULA (I)

in which

R is an alkyl,

Z and Z' are hydrogen, methyl, ethyl or a mixtures thereof,

Q is an aliphatic amine or hydroxyl, such that from about 55 to about 95 percent of Q is an aliphatic amine, X is an integer from 4 to 200, and Y is an integer from 2 to 6.

The preferred polyether polyamine has an average molecular weight of greater than 2500 and has an average of about 1.8 to about 3 active hydrogen-containing groups. Preparation of polyurethane/polyurea foams from amine-terminated compounds is taught in U.S. Pat. No. 3,380,076 which is incorporated herein by reference in its entirety. It is recognized that polyurea foams optionally have groups such as urethane groups as well as urea groups.

The preferred polyether polyamine also has a substantial percentage of its terminal hydroxyl groups as primary hydroxyl group. It is especially preferred that at least about 75 percent of the active hydroxyl group of polyether polyamine be in the form of primary hydroxyl groups. It has been found that the primary hydroxyl groups are more likely to react during the polymerization of the polyamine with the isocyanate, so the resulting polyurea foam demonstrates improved crosslinking characteristics. Therefore, polyurea foam having improved characteristics can be produced with less than fully aminated polyether polyamines, and the primary hydroxyl groups will be incorporated into the polymer matrix. Thus, the lower the amination of the polyether, the more important primary hydroxyl groups become. Moreover, the length of time between the mixing of the reactants and the occurrence of the gel point is extended because the polyether polyamine is not fully aminated.

The polyether polyamines suitable for use in the present invention are typically prepared from an appropriate initiator, usually a polyhydroxy alcohol such as glycerine or ethylene glycol, to which a lower alkylene (e.g. ethylene, propylene, butylene or mixtures thereof) oxide is added with the resulting hydroxyl terminated polyol being subsequently aminated. Especially preferred are those polyether polyols of about 3,000 molecular weight and above derived from trihydric initiators. If two or more alkylene oxides are used, they may be present as either random mixtures or as blocks of one or the other polyether. The polyether polyol is then aminated to replace between about 55 and about 95 percent of the hydroxyl groups with amine groups.

It is especially preferred that at least 75 percent of the hydroxyl groups of the polyol be primary hydroxyl groups so that most of the hydroxyl groups of the resulting polyamine are primary hydroxyl groups. Thus, if the polyol is derived from alkylene oxides, it is desirable to cap, or terminate, the polyol formation with an amount of ethylene oxide to ensure that the majority of terminal hydroxyl groups are primary hydroxyl groups. This preferred polyol is often usually termed as "ethylene oxide terminated."

A particular polyether polyol useful in practicing the present invention has the following formula:

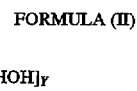

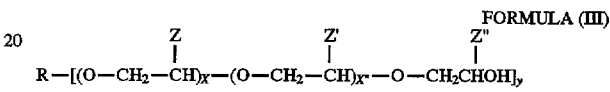

in which

R is an alkyl,

Z is hydrogen, methyl, ethyl or a mixtures thereof,

Z' and Z" are hydrogen, methyl, ethyl or a mixtures thereof, such that at least about 75 percent of Z" is hydrogen, X is an integer from 1 to 200, X' is an integer from 1 to 200, Y is an integer from 2 to 6, such that (X+X') is from 4 to about 200.

An especially preferred polyol is an ethylene oxide terminated polyether polyol derived from a trihydric initiator on which propylene oxide is first added. This polyol has the following formula:

FORMULA (III)

$$R-[(O-CH_2-CH)_X-(O-CH_2-CH)_{X'}-O-CH_2CHOH]_y$$

in which

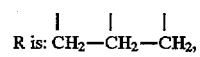

Y is 3,

Z is hydrogen, methyl, ethyl or a mixtures thereof,

Z' and Z" are hydrogen, methyl, ethyl or a mixtures thereof, wherein at least about 75 percent of Z" is hydrogen, X is an integer from 1 to 200, and X' is an integer from 1 to 200, such that the average molecular weight of the polyol is about 5000.

This product is commercially available from Eastman Chemical as THANOL SF-5505. When aminated, this polyol has both primary amines and primary hydroxyl units, so the polyurea foam has better cross-linking characteristics than a foam derived from a polyamine having essentially all secondary hydroxyl groups.

The isocyanates that can be used in accordance with the invention will be familiar to those skilled in the polyurethane/polyurea art and comprise all those compounds which can be used in the manufacture of polyurethanes. In principle, any polyfunctional (two or more functional groups) alkyl or aryl isocyanates, or mixture thereof, can be used. Preference is given to those isocyanates which are most often used industrially in the manufacture of polyurethane foam, i.e. the isomers of toluene diisocyanate (TDI), methylene bis(4-phenylisoxyanate) (MDI), and mixtures thereof.

Of course, the term isocyanate also includes quasiprepolymers of polyisocyanates with active hydrogen containing materials. The active hydrogen containing materials of the quasiprepolymer can include, but are not limited to high molecular weight polyols, polyamines, and combination thereof. The polyisocyanates used to prepare the quasiprepolymer can include, but are not limited to the polyfunctional isocyanates described above. Use of a quasiprepolymer the time available for processing the polyurea foam (i.e. improved gel time) and prevents pre-gelation of the polyurea foam by diluting the isocyanate component.

The polyols suitable for preparing an isocyanate quasiprepolymer include polyether polyols, polyester diols, triols, tetrols, etc., having an equivalent weight of at least about 500, and preferably at least about 1000 up to about 3,000. Those polyether polyols based on trihydric initiators of about 4,000 molecular weight and above are especially preferred. The polyether may be prepared from ethylene oxide, propylene oxide, butylene oxide or mixtures of ethylene oxide, propylene oxide and/or butylene oxide. Other high molecular weight polyols which may be useful in this invention are polyethers and polyesters of hydroxyl terminated rubbers, e.g., hydroxyl terminated polybutadiene. Primary hydroxyl terminated quasiprepolymers of polyols and isocyanates are also useful in this invention.

The polyamines suitable for preparing an isocyanate quasiprepolymer include partially and fully aminated polyols. In particular, the polyether polyamines described above and shown in Formula (I) are particularly suitable for use in preparing a quasiprepolymer with an isocyanate. Those polyether polyamines and polyether polyols with primary hydroxyl groups are more preferred because the primary hydroxyl groups are more reactive than secondary hydroxyl groups.

The quasiprepolymer may be prepared by reacting a stoichiometric excess of a polyisocyanate compound with a polyol or polyamine. In this embodiment, the isocyanate component may be, for example, used in proportions of from about 30 percent to about 200 percent stoichiometric excess with respect to the proportion of functional groups in the active hydrogen-containing compounds. Since the present invention relates to polyurea foams, it will be appreciated that a prepolymer derived from a polyol or a partially aminated polyamine would result in a polyurethane modified polyurea foam.

The amount of isocyanate employed with the present invention should be sufficient to provide an isocyanate index of 0.5 to 1.5 and preferably from 0.7 to 1.3. The therm "isocyanate index" refers to the ratio of isocyanate groups (—NCO groups) over reactive hydrogen atoms. The isocyanate index is oftentimes represented in terms of percentage which, of course, would simply mean that the index, as defined above and used herein, is multiplied by 100.

In addition to the aminated polyol and the isocyanate, various other components and additives are used to improve the processing and performance of the final product. These auxiliary components are well known in the polyurea art and include blowing agents, blowing catalyst, gelling catalyst, surfactants, chain extenders, cross-linkers, and other additives.

Blowing agents are included in the polyurea foam to produce a cellular product by causing bubbles to form during the reaction. The blowing agent can be a chemical that vaporizes during the reaction, or it can produce carbon dioxide gas. The polymerization reaction can be exothermic, which vaporizes water or the blowing agents, or both, causing the polymer to expand into a cellular foam. Also, if water is added, the carbon dioxide gas formed in the reaction between the water and the isocyanate act as a blowing agent.

A blowing agent is advantageously used to generate the gas or vapor for bubbles in foam formation. The term "water-blown" foams is used to designate foams in which water is the primary blowing agent, that is, at least about 50 percent of the moles of gas used in blowing come from water or the reactions thereof. Water reacts with isocyanate groups to form carbon dioxide gas and may also react with other compounds or be vaporized. Other blowing agents or mixtures thereof are suitable for use with water in the practice of the invention. Other suitable blowing agent include blowing agents which are volatile at temperatures reached in the foaming process, blowing agents which react or split to form gases, and dispersed inert gases. Suitable organic blowing agents include acetone; ethyl acetate; methanol; ethanol; halogenated alkanes such as methylene chloride; chloroform; hard chlorofluorocarbons (not having hydrogen atoms) such as monofluorotricholormethane, dichlorodifluoromethane and the like; soft chlorofluorocarbons (having hydrogen atoms) such as chlorodifluoromethane and the like; butane; hexane; heptane; diethyl ethyl, and the like. Gases inert to the starting components such as nitrogen, air, carbon dioxide and the like are also useful blowing agents. Compounds such as azides which decompose at temperatures present in the mold to produce gases such as nitrogen are also useful.

In the practice of the invention, water is preferably used alone as blowing agent; when mixtures of other (auxiliary) blowing agents with water are used, the preferred auxiliary blowing agents for the purpose of preparing foams having physical properties suitable for most applications are soft chlorofluorocarbons, methylene chloride, other halogenated alkanes and the like. It is, however, preferable, for reasons of complying with the Montreal Protocol, to reduce the use of hard chlorofluorocarbons in foam preparation.

The amount of blowing agent employed should be sufficient to achieve a preselected amount of foaming of the reaction mixture. Said amount will vary with factors such as the preselected density desired in a foamed product. In the practice of the invention, water-blown foams preferably utilize from about 2 to about 15, more preferably from about 2 to about 12 parts by weight of water per hundred parts by weight of active hydrogen components.

When other blowing agents are used with water, the amount of water is generally reduced in proportion to the amount of auxiliary blowing agents used. The relative proportions of water reduced to other blowing agent(s) used is generally determined by their relative blowing indexes which reflect the moles of blowing agent generated relative to the weight of blowing agent. For instance, one part of water per hundred of active hydrogen components is generally replaced by ten parts of trichlorofluoromethane or with nine parts of methylene chloride. Trichlorofluoromethane has a blowing index of ten, and methylene chloride has a blowing index of nine. Those skilled in the art are familiar with using blowing indexes to determine mixtures of blowing agents suitable for preparing foams having preselected physical properties.

It is known to one skilled in the art that, in order to achieve optimum properties in expanded polyurethane plastics, so-called "hard segments" must be present in the polymer matrix for morphological reasons. It is also known that, for this purpose, aromatic polyisocyanates in particular are reacted with water using suitable catalysts. Carbamic acids which decompose into primary aromatic amines and carbon dioxide with decarboxylation are formed from the polyisocyanates and water in the course of this reaction. While the primary aromatic amines spontaneously react with further isocyanate to give polymeric urea, which forms the hard segments, the autogenously produced carbon dioxide is used as a blowing agent.

In the process of the invention, formation of hard segments is effected by the catalytic decomposition of excess isocyanate with water. Blowing catalysts are used are to accelerate the isocyanate/water reaction as selectively as possible. The blowing catalysts known in the polyurea and polyurethane arts are useful in the present invention.

Tertiary amines known per se from polyurethane chemistry can be used as blowing catalysts in the process of the invention. An overview of types and modes of action is given in the above-mentioned "Kunststoffhanbuch" [Plastics Handbook], Volume VII (Polyurethanes), in particular on pages 92 to 98.

In a preferred embodiment of the invention, the catalysts having tertiary amino groups are of the general formula:

$$XCH_2CH_2MCH_2CH_2Y \quad \text{FORMULA (IV)}$$

where

M denotes oxygen or a methylimino group;

X is chosen from the group consisting of N-morpholinyl, dimethylamino and N-azanorbornyl groups; and Y is chosen from the group consisting of N-morpholinyl, dimethylamino, hydroxyl, N-methyl-N-(2-hydroxy-$C_1$-$C_2$-alkyl)-amino group, and N-azanorbornyl.

Particularly preferred blowing catalysts are selected from the group consisting of 2,2-dimorpholinodiethyl ether, 2-(2-dimethylamino)-ethoxyethanol, bis-(2-dimethylaminoethyl) ether, 2-(2 dimethyl-aminoethyl)-2-methylaminoethanol and 2-(2-dimethylaminoethoxy)-ethylmethylaminoethanol. Typical examples of such blowing catalysts are:

bis-(2-dimethylaminoethyl) ether; (available from Huntsman Corporation as TEXACAT ZF-20)

2,2-dimorpholinodiethyl ether; (available from Huntsman Corporation as TEXACAT DMDEE)

2,(2-(dimethylaminoethoxy)-ethylmethylamino)-ethanol; (available from Huntsman Corporation as TEXACAT ZF-10)

2-(2-dimethylaminoethoxy)-ethanol; (available from Huntsman Corporation as TEXACAT ZF-10)

N,N,N',N',N"-pentamethyldiethylenetriamine; (available from Huntsman Corporation as TEXACAT PMDETA)

bis-azanorbornylethyl) ether, according to DE-A 37 07 911;

2-(-hydroxyethoxy)-ethylazanorbornane, according to DE-A 37 07 911;

2-(2-dimethylaminoethyl)-2-methylaminoethanol; (available from Air Products as DABCO T)

N,N,N'-trimethyl-N'-(ethoxyethanol)-ethylenediamine, according to U.S. Pat. No. 4,582,938 incorporated herein by reference; and 2,5,11-trimethyl-2,5,11-triaza-8-oxadodecane, according to U.S. Pat. No. 4,582,983.

A further preferred blowing catalyst having tertiary amino groups is 2,2,4-trimetyl-1-oxa-2-sila-4-azacyclohexane available from Bayer, AG.

In another advantageous embodiment of the invention, the blowing catalysts are used in amounts of from 0.001 to 5, in particular of 0.05 to 3, parts by weight per hundred parts by weight of the active hydrogen components. The blowing catalysts are preferably dissolved in the surfactant. The amount of water is calculated so that it corresponds at least to the aliquot amount of polyisocyanate which is required for formation of the amount of hard segment and autogenously produced blowing agent required according to the formulation; however, the added amount of water may also be several times in excess of this amount.

A gelling catalyst for the reaction of the amine-terminated compound and the polyisocyanate can also used in making foam according to this invention. Although a wide variety of materials are known to be useful for this purpose, the most widely used and preferred gelling catalysts are the tertiary amine catalysts.

Exemplary tertiary amine gelling catalysts, include, for example, triethylenediamine, diethyl ethanolamine, 1-methyl-4-dimethylaminoethyl piperazine, 3-methoxy-N-dimethylpropylamine, N,N-diethyl 3-diethylaminopropylamine, dimethylbenzyl amine, bis(2-dimethylaminoethyl)ether, and the like. Tertiary amine gelling catalysts are advantageously employed in an amount from about 0.01 to about 5, preferably about 0.05 to about 2 parts per 100 parts by weight of the active hydrogen containing compounds.

Surfactants can be used with the current invention to provide a consistent reaction mixture by enabling the foam to rise at a more uniform rate and helping to prevent foam cells from collapsing. The surfactant also enhance certain properties of the finished product by influencing cell structure. The surfactants most often used are silicones. Surfactants can be used in from about 0.01 to about 5, and preferably from about 0.1 to 5, parts by weight per 100 parts by weight of the active hydrogen compounds.

Chain extenders may also be used to further improve the load-bearing of the foam. Chain extenders, for the purposes of this invention, include compounds having two active hydrogen-containing groups per molecule and an equivalent weight from about 31 to about 300, preferably about 31 to about 150. Hydroxyl-containing chain extenders include the alkylene glycols and glycol ethers such as ethylene glycol, 1,3-propylene glycol, 1,4-butylene glycol, 1,6-hexamethylene glycol, diethylene glycol, triethylene glycol, dipropylene glycol tripropylene glycol, 1,4-cyclohexanedimethanol and the like. Amine chain extenders include diethyltoluene diamine, phenylene diamine, methylene (bis(o-chloroaniline), NaCl blocked methylene bis (anline), toluene diamine, aromatic diamines which are substituted at least one of the carbon atoms adjacent to the amine groups with a lower alkyl group, and the like. Such chain extenders, when used, are advantageously employed in a minor amount, i.e., less than about 5 parts by weight per 100 parts by weight active hydrogen compound. Most preferably, the combined weight of chain extender and cross-linker is less than 5 parts by weight per 100 parts by weight active hydrogen compound. It is usually preferable, however, to prepare the foam in the absence of a chain extender.

Cross-linkers may be used, particularly in making molded foam or high resiliency slabstock foam, in order to improve load-bearing and processing. Suitable such cross-linkers include alkanolamines and other compounds of about 200 or lower equivalent weight having about 3–8, preferably about 3–4 active hydrogen-containing groups per molecule. Exemplary such as compounds are glycerine and trimethylolpropane, as well as other alkylene triols. Preferred, however, are alkanolamines such as diethanolamine, triisopropanolamine, triethanolamine, diisopropanolamine, adducts of 4–8 moles of ethylene oxide and/or propylene oxide with ethylene diamine and the like, and polyamines such as methylene bis(o-chloroaniline), ethylenediamine, ammonia and the like. Most preferred, on the basis of its optimum reactivity, is diethanolamine. One advantage of the foam of this invention is that, at an equivalent level of cross-linker, the foam exhibits better load-bearing characteristics than similar foams made without the amine-terminated compound. Accordingly, to achieve equivalent load-bearing, it is possible with this invention to reduce or even eliminate the cross-linker compound. When used, however, less than 5 parts, preferably about 0.1 to about 4 parts of the cross-linker are advantageously employed per 100 parts of the active hydrogen compound. It is most preferred that the combined weight of cross-linker and chain extender, when used, is less than 5 parts per 100 parts by weight of the active hydrogen compound.

Other additives include impact modifiers, which help fabricated plastics resist fracturing when stressed, and stabilizers, which minimize the degradation or breakdown of polyurethanes by heat, light, microorganisms, and oxygen in the air. In addition, flame retardants and antistatic agents can be used. Finally, fillers and reinforcements, as known in the art, can be used.

Generally, polyurea foams can be produced by a one-step method in which all the reactants are simultaneously metered, mixed, and dispensed onto a conveyor on into a mold. In addition, a multi-stream process can be used in which the ingredients are pre-mixed into two or more components. Then, all of the components are simultaneously metered, mixed, and dispensed. One variation of the multi-stream process includes an initial step of preparing the quasiprepolymer of the polyisocyanate which serves as one of the component streams. The present invention can be practiced with each of these processes, with the multi-stream process involving a polyisocyanate quasiprepolymer the most preferred. In a particularly preferred embodiment, two component streams are prepared: a first stream is comprises a polyether polyamine and water as a blowing agent; and a second stream containing an polyisocyanate or a quasiprepolymer thereof. In this embodiment, additional additives, such as catalysts, chain extenders, etc., can be added to either the first or second stream. The present invention is particularly suited for use in reaction injection molding processes and machines known in the polyurea and polyurethane arts.

In addition, the process for producing polyurea foam can be performed under a variety of conditions; however, the high pressure machines currently used achieve impingement mixing are preferred over the low pressure machines using spin mixing. The temperature of the components or streams is preferably elevated sufficiently to maintain a desired viscosity. Generally, the temperature of the components should be at least 100 degrees F.

EXAMPLE I

A first mixture was prepared by adding a polyether polyamine (100 pbw, 27.84 lbs), into a 5 gallon container along with a surfactant (0.50 pbw, 63.21 grams), a blowing catalyst (0.1 pbw, 12.64 grams), gelation catalyst (0.40 pbw, 50.57 grams), deionized water (3.37 pbw, 0.94 lbs) and chain extender (3.37 pbw, 0.94 lbs). The polyether polyamine had an amine value of 0.53 meq/g or about 85% amination, and had an average molecular weight of about 5000. The polyamine is available from Huntsman Corporation under the name JEFFAMINE T-5000. The surfactant is commercially available from Air Products under the name DC-5164. The blowing catalyst and the gelation catalyst are available from Huntsman Corporation under the names ZF-20 and TD-33A, respectively. The chain extender was a four function polyol available from Huntsman Chemical as JEFFAMINE C-346. The contents of the first mixture were mixed and poured into the B-component working tank of a Hi-Tech RIM machine. The contents of the B-component working tank were placed under 90 psi of nitrogen and heated to 145° F.

A second mixture was prepared reacting 100 pbw TDI (toluene diisocyanate) with 50 pbw of a 5000 molecular weight triol made from propylene oxide to form an isocyanate quasiprepolymer. The second mixture was poured into the A-component working tank on the RIM machine and heated to 135° F. under 90 psi of nitrogen. The TDI is a blend of 80 percent 2,4 TDI isomer and 20 percent 2,6 TDI isomer, known as Type I, and is commercially available from the Olin Chemical Co. The 5000 molecular weight triol is available from Huntsman Corporation as G-5000 and is prepared from glycerine and propylene oxide.

Both working tanks were pressured up to 2000 psi, the first and second mixtures were shot into a metal molds using a weight ratio of 0.54, a volume ratio of 0.47 and an index of 1.0. The molds had a dimension of 15"×7.5"×4" and 15"×15"×4", and they were preheated to 125° F. prior to filling. The properties of the polyurea foam are shown in Table 1.

EXAMPLE II

A first mixture was prepared by adding a low aminated polyamine (100 pbw, 27.84 lbs), into a 5 gallon container along with DC-5164 (0.50 pbw, 63.21 grams), ZF-20 (0.1 pbw, 12.64 grams), TD-33A (0.40 pbw, 50.57 grams), deionized water (3.37 pbw, 0.94 lbs) and JEFFAMINE C-346 (3.37 pbw, 0.94 lbs). The polyamine was a low aminated polyetherpolyamine, 6940-79-1, which was from a trifunctional, ethyleneoxide tipped, 5000 molecular weight polyol commercially available from Eastman Chemicals under the name THANOL SF-5505. The polyamine had a total acetylatables of 0.63 meq/g, a total amine value of 0.367 meq/g (58% aminated) and a primary amine content of 0.348 meq/g.

The first mixture was mixed and poured into the B-component working tank of a Hi-Tech RIM machine. The B-component working tank was placed under 90 psi of nitrogen and heated to 140° F.

A second mixture was prepared reacting 100 pbw TDI (Type I) with 50 pbw of a 5000 molecular weight triol (G-4000) to form an isocyanate quasiprepolymer. The second mixture was poured into the A-component working tank on the RIM machine and heated to 135° F. under 90 psi of nitrogen.

Both working tanks were pressured up to 2000 psi, the first and second mixtures were shot into a metal molds using a weight ratio of 0.54, a volume ratio of 0.47 and an index of 1.0. The molds had a dimension of 15"×7.5"×4" and 15"×15"×4", and they were preheated to 120° F. prior to filling. The properties of the polyurea foam are shown in Table 1.

TABLE 1

| Foam Properties | | |
|---|---|---|
| Example number | 1 | 2 |
| Ball rebound, % | 42 | 41 |
| Density, pcf | 2.63 | 2.77 |
| Tensile, psi | 10.27 | 10.42 |
| Elongation, % | 131 | 136 |
| Tear, pli | 1.2 | 1.2 |
| Compression set | | |
| 50% | 14.4 | 16.2 |
| 75% | 13.9 | 11.6 |
| Wet Set, % | 24.5 | 19.6 |
| ILD | | |
| 25% | 27 | 25 |
| 65% | 71 | 81 |
| 25% return | 21 | 19 |
| Sag Factor | 2.7 | 3.2 |
| Humid aging | | |
| 50% compression | 26 | 32 |
| CLD loss | 14.3 | 35 |
| Burn Test | | |
| time, sec. | 230 | 28 |
| distance, in. | 14 | 1.8 |

Examples I and II demonstrate that a polyurea foam having beneficial characteristics can be prepared from a partially aminated polyether polyamine. The use of partial aminated polyethers and the use of polyisocyanate quasiprepolymers extend the time between the mixing of the polyamine and the isocyanate and the occurrence of the gel point which is the point in which an infinite polymer network is formed. Thus, the polyurea foam produced in accordance with this invention has improved molding characteristics. In addition, as polyether polyamines having lower percentages of active amine groups are used, primary hydroxyl groups are beneficial in maintaining and improving the characteristics of the polyurea foam.

The present invention, as with all polyurea foams and processes for producing polyurea foams, can be altered as desired without departing from the scope of the present invention. For example, it is known that polyurea foams, unlike polyurethane foams, have improved physical properties because of increased hydrogen bonding if they are post cured at elevated temperatures. Usually, a four hour post cure time at a temperature of between about 300 and 350 degrees F. provides the best overall properties. However, higher temperatures and longer periods can be beneficial for some properties, such as strength, even though other properties, such as compression, can start to decline. In addition, urea can be used as a blowing catalyst instead of tertiary amine catalyst to produce a low odor polyurea foam.

In addition to the processes for producing the polyurea foam described herein, the present invention encompasses the polyurea foam produced by such processes.

The above described and exemplified invention may be embodied in other forms or carried out in other ways without departing from the spirit or essential characteristics thereof. The present embodiment is therefore to be considered in all respects illustrative and not restrictive and modifications and variation of the invention as hereinbefore set forth may be made without departing from the spirit and scope thereof.

What is claimed is:

1. A process for preparing a polyurea foam which comprises reacting:
   an aliphatic polyoxyalkylene polyamine having an average functionality from about 2 to about 6 wherein 64 to about 95 percent of the functional groups are primary amines and including primary or secondary hydroxyl groups among the remaining functional groups; with
   a polyisocyanate quasiprepolymer formed by reacting a polyfunctional isocyanate with an active hydrogen-containing compound selected from the group consisting of polyols, polyamines and mixtures thereof, wherein the polyisocyanate quasiprepolymer is employed in an amount sufficient to provide an isocyanate index of 0.5 to 1.5; and in the presence of
   a blowing agent that comprises water;
   wherein said foam is prepared in the absence of a chain extender, or is prepared in the presence of a chain extender that is present in an amount of less than about 5 parts by weight per 100 parts by weight active hydrogen compound.

2. A process of claim 1 for preparing a polyurea foam wherein at least about 75 percent of the functional hydroxyl groups are primary functional groups.

3. A process of claim 1 for preparing a polyurea foam wherein the polyamine comprises compounds of general formula:

$$R-[(O-CH_2-CH)_X-O-CH_2-CH-Q]_Y$$
$$\phantom{R-[(O-CH_2-C}|\phantom{)_X-O-CH_2-CH}|$$
$$\phantom{R-[(O-CH_2-C}Z\phantom{)_X-O-CH_2-CH}Z'$$

wherein,
R is an alkyl,
Z and Z' are hydrogen, methyl, ethyl, or mixtures thereof,
Q is amine or hydroxyl in which from 64 to about 95 percent of Q is amine,
X is an integer from 4 to 200, and
Y is an integer from 2 to 4.

4. A process of claim 3 for preparing a polyurea foam wherein at least about 75 percent of Z' is hydrogen.

5. A process of claim 1 for preparing a polyurea foam wherein the polyamine is a partially aminated polyol, the polyol comprising compounds of general formula:

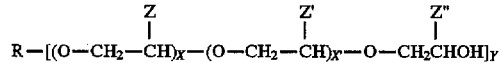

wherein
R is an alkyl,
Z is hydrogen, methyl, ethyl or a mixtures thereof,
Z' and Z" are hydrogen, methyl, ethyl or a mixtures thereof, such that at least about 75 percent of Z" is hydrogen,
X is an integer from 1 to 200,
X' is an integer from 1 to 200,
Y is an integer from 2 to 6, such that (X+X') is from 4 to about 200.

6. A process of claim 1 for preparing a polyurea foam wherein the polyamine is an partially aminated polyol, the polyol comprising compounds of general formula:

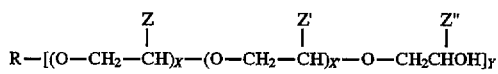

in which

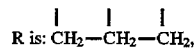

Y is 3
Z is hydrogen, methyl, ethyl or a mixtures thereof,
Z' and Z" are hydrogen, methyl, ethyl or a mixtures thereof, wherein at least about 75 percent of Z" is hydrogen,
X is an integer from 1 to 200, and
X' is an integer from 1 to 200, such that the average molecular weight of the polyol is about 5000.

7. A process of claim 1 for preparing a polyurea foam wherein the isocyanate is selected from a group comprising polyfunctional alkyl isocyanates, polyfunctional aryl isocyanates, and mixtures thereof.

8. A process of claim 1 for preparing a polyurea foam wherein the isocyanate comprises a polyisocyanate quasiprepolymer formed by reacting:
   a polyisocyanate component selected from a group consisting of polyfunctional alkyl isocyanates, polyfunctional aryl isocyanates, and mixtures thereof; with
   an active hydrogen-containing compound selected from the group consisting of polyols, polyamines, and mixtures thereof.

9. A process of claim 1 for preparing a polyurea foam wherein the reaction of the polyamine with the isocyanate is in the presence of an additive selected from gelation catalysts, blowing catalysts, surfactants, or mixtures thereof.

10. A process of claim 1 for preparing a polyurea foam wherein the polyamine and the isocyanate are at temperatures of at least about 100 degrees F. and the reaction is produced by contacting the polyamine and the isocyanate with a high pressure impingement mixer.

11. The polyurea foam produced by the process of claim 1.

12. The polyurea foam produced by the process of claim 11.

13. A process for preparing a polyurea foam which comprises the following steps:

a) preparing a first mixture comprising a polyamine of the formula:

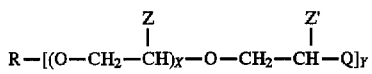

wherein,

R is an alkyl,

Z and Z' are hydrogen, methyl, ethyl, or a mixture thereof,

Q is amine or hydroxyl in which from 64 to about 95 percent of Q is amine,

X is an integer from 4 to 200, and

Y is an integer from 2 to 6;

b) preparing a second mixture comprising a polyisocyanate quasiprepolymer formed by reacting a polyfunctional isocyanate with an active hydrogen-containing compound selected from the group consisting of polyols, polyamines and mixtures thereof, wherein the polyisocyanate quasiprepolymer is employed in an amount sufficient to provide an isocyanate index of 0.5 to 1.5; and c) reacting the first and the second mixtures in a high pressure impingement mixer in the presence of a blowing agent comprising water;

wherein said foam is prepared in the absence of a chain extender.

14. A process of claim 13 for preparing a polyurea foam wherein at least about 75 percent of Z' is hydrogen.

15. A process of claim 13 for preparing a polyurea foam wherein the polyamine is a partially aminated polyol, the polyol comprising compounds of general formula:

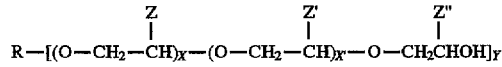

wherein

R is an alkyl,

Z is hydrogen, methyl, ethyl or a mixtures thereof,

Z' and Z" are hydrogen, methyl, ethyl or a mixtures thereof, such that at least about 75 percent of Z" is hydrogen, X is an integer from 1 to 200, X' is an integer from 1 to 200, Y is an integer from 2 to 6, such that (X+X') is from 4 to about 200.

16. A process of claim 13 for preparing a polyurea foam wherein the isocyanate is selected from a group comprising polyfunctional alkyl isocyanates, polyfunctional aryl isocyanates, and mixtures thereof.

17. A process of claim 13 for preparing a polyurea foam wherein the first and second mixtures are at temperatures of at least about 100 degrees F. and the reaction is produced by contacting the first and second mixtures with a high pressure impingement mixer.

18. The polyurea foam produced by the process of claim 13.

19. A process for preparing a polyurea foam which comprises reacting in a high pressure mixer:

an aliphatic polyether polyamine having an average functionality from about 2 to about 6 wherein 58 to about 95 percent of the functional groups are primary amines and including primary or secondary hydroxyl groups among the remaining functional groups, and having an average equivalent weight from about 400 to about 5000; with a polyisocyanate quasiprepolymer formed by reacting a polyfunctional isocyanate with an active hydrogen-containing compound selected from the group consisting of polyols, polyamines and mixtures thereof, the polyisocyanate quasiprepolymer employed in an amount sufficient to provide an isocyanate index of 0.5 to 1.5; and in the presence of a blowing agent that comprises water;

wherein said foam is prepared in the absence of a chain extender, or is prepared in the presence of a chain extender that is present in an amount of less than about 5 parts by weight per 100 parts by weight active hydrogen compound.

20. The polyurea foam produced by the process of claim 19.

* * * * *